March 3, 1931. C. W. RUNDLETT 1,795,044
AUTOMOBILE HEATING APPARATUS
Filed July 27, 1927
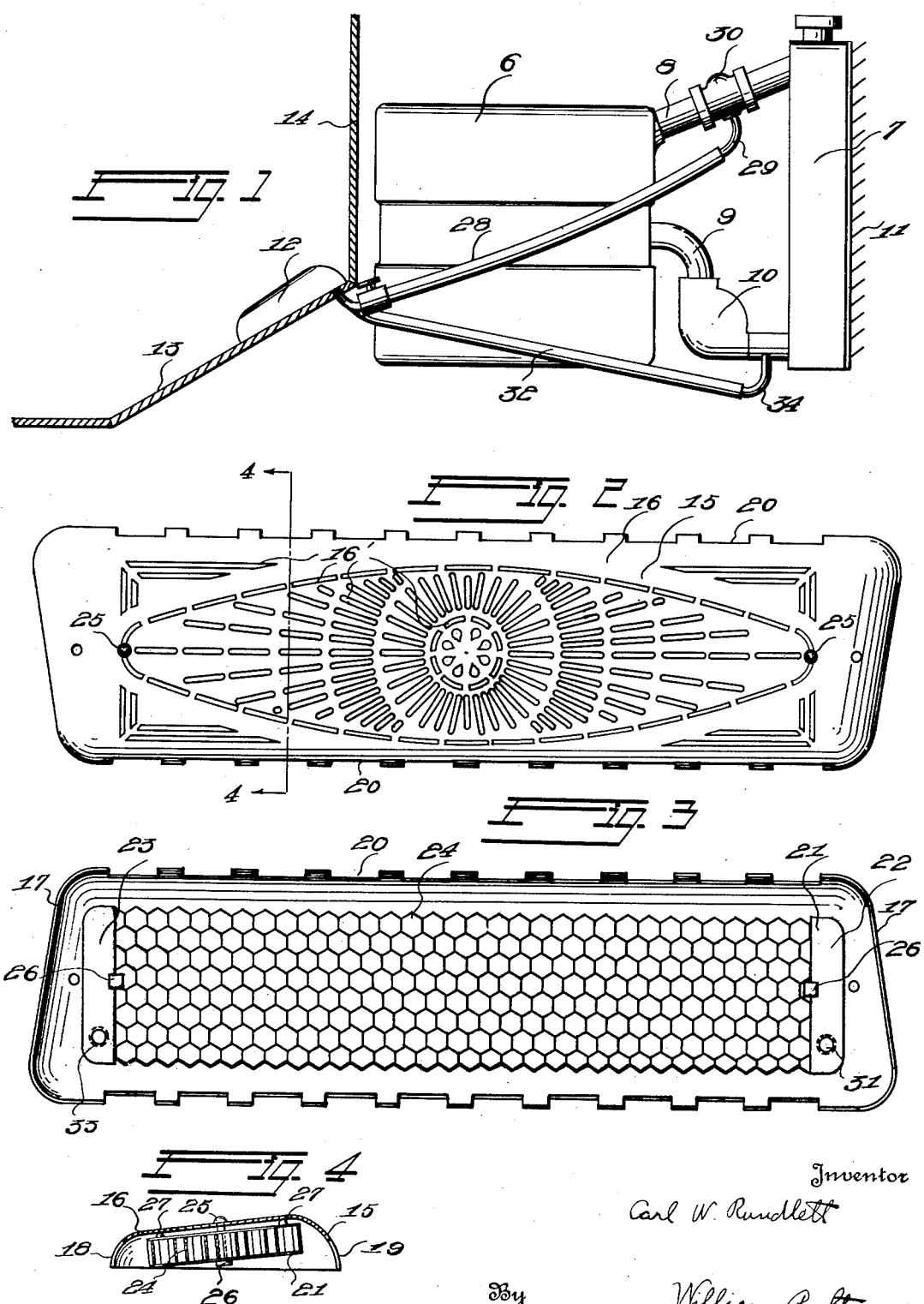
Inventor
Carl W. Rundlett
By William A. Strauch
Attorney Patented Mar. 3, 1931

1,795,044

UNITED STATES PATENT OFFICE

CARL W. RUNDLETT, OF JACKSON HEIGHTS, NEW YORK, ASSIGNOR TO MOT-ACS INCORPORATED, OF NEW YORK, N. Y., A CORPORATION OF DELAWARE

AUTOMOBILE HEATING APPARATUS

Application filed July 27, 1927. Serial No. 208,779.

This invention relates to an automobile heater of the type that uses the water of the circulatory system, ordinarily provided to maintain the engine at proper temperatures, to heat the car, and a novel heating system for a motor vehicle.

It has been found in the practical application of heaters designed to use the water of the engine cooling system of an automobile that it is essential that only a restricted or limited quantity of water be taken from that system in order to avoid interference with the proper cooling of the engine and the temperature of the water must not be raised to the point where serious loss of anti-freezing fluids by boiling will occur. It is entirely practical to utilize a restricted quantity, less than 20% of the water in the entire system to heat the interior of the body of the car. If a greater proportion of the water is taken from the system the efficiency of the cooling system is seriously affected. A practical automobile heater accordingly must be of a type that will radiate the maximum quantity of heat from a very limited quantity of available heated water.

Systems have heretofore been proposed in which only a restricted quantity of water diverted from the cooling systems have not been entirely satisfactory because sufficient heating of the car could not be effected in comparatively cold weather with a water temperature suitable for satisfactory engine operation and below the boiling temperature of a binary mixture of alcohol and water. For satisfactory operation in winter where an alcohol anti-freezing mixture is utilized the water temperatures should not exceed about 150° F. and the water temperatures encountered in practice are usually from 100° to 140° F. in cold weather.

A primary object of this invention is to provide a heat radiating element for the interior of the car designed to radiate heat freely so that fluid temperatures in the cooling system of from 110° to 140° F. are sufficient to heat an automobile in commercially satisfactory manner.

A further object of the invention is to provide a novel system of heating an automobile in which the maximum of radiation is secured from a minimum diversion of water permitting satisfactory heating to be secured in cold weather with temperatures below the boiling point of a binary mixture of alcohol and water.

A further object of the invention is to provide a novel heat radiating element for the interior of the car designed to give maximum radiating surface and capacity and to permit free circulation of air across the radiating surfaces, and at the same time of such compact nature and so encased as to protect the radiating elements while supported on the floor of a car and serving as a foot-rest without being of sufficient size to cause an undesirable obstruction in the car body.

A still further object of the invention is to provide a heat radiating element for the interior of the car that permits free circulation of the air in the car to substantially all parts of the radiating element, but which is at the same time encased in a manner that will not interfere with the circulation while substantially protecting the radiating element from injury in shipment and by the occupants of the car, and which at the same time may serve as a foot rest without forming an undesirable obstruction.

Further objects of the invention will appear as the description thereof proceeds with reference to the accompanying drawings in which—

Figure 1 is a diagrammatic side elevation showing one embodiment of my invention.

Figure 2 is a top plan view of the heat radiating element.

Figure 3 is a bottom plan view of the heat radiating element, and

Figure 4 is a transverse sectional view taken on line 4—4 of Figure 2.

Similar reference characters indicate like parts throughout the several figures of the drawings.

In the drawings 6 indicates the engine of the automobile and 7 the radiator. The jacket of engine 6 is connected to the radiator 7 by conduits 8 and 9 in the latter of which a pump 10 is arranged. In well known manner pump 10 circulates the water between the engine and radiator to cool the engine. A suitable front 11 may be provided for the radiator, if desired. Said front may have manually or automatically operated shutters to control the temperature of the water in well known manner, as will be understood by persons skilled in this art.

In order to heat the interior of the car, a heat radiating element 12 is arranged within the body of the car, preferably a closed car. This element is preferably disposed on the floor 13 either in back of the dash 14 or elsewhere in the body of the car in position to receive the feet of an occupant of the car. As shown in Figure 1, said element is wholly above the top surface of the floor of the car for a purpose presently to be described.

A preferred form of heat radiating element 12 is shown in detail on an enlarged scale in Figures 2, 3 and 4. It comprises an outer supporting and protecting casing 15, having a top surface 16 that is downwardly flanged on all of its sides, the end flanges being indicated by numeral 17 and the side flanges by numerals 18 and 19. As clearly shown in Figures 1 and 4, the rear flange 18 is narrower than the front flange 19, and the end flanges 17 are correspondingly formed to cause the top surface of the casing to be inclined forwardly to constitute a convenient foot rest. It will, however, be understood that the flanges may be of equal width if desired. The side flanges 18 and 19 are provided with openings 20 of substantial size, and similar openings may be formed in the end flanges 17 if desired.

The top surface 16 of casing 15 is provided with a multiplicity of openings 16', the openings being elongated and substantially uniformly spaced throughout the top surface and preferably arranged to form a pleasing design.

It should be understood, however, that openings of other configuration and arrangement may be provided, the primary consideration being that comparatively free circulation of air through the casing may be permitted. As the temperature of the heating medium is low as compared to the temperatures utilized in prior proposed automobile heating systems, it is essential that the casing permit substantially free circulation of the air, a requisite not required by the theory of operation of the prior automobile heating systems. For most satisfactory results the total air egress space in the casing should be equal to or greater than the total air ingress space to the casing.

Supported beneath casing 15 is the radiating element proper designated as a whole by the numeral 21. It comprises hollow prismoidal headers 22 and 23, connected together by a cellular structure 24 formed of thin strips of metal secured together in pairs at their edges and to each other in such manner as to form a honeycomb structure as shown in Figures 3 and 4 with a plurality of tortuous paths formed between the pairs of strips for thin bands or streams of water and the strips forming the sides of cells for the upward passage of air in contact with the outer surfaces of the strips. The structure 24 is secured at its ends to the headers 22 and 23, so that the water can circulate from one header to the other through the tortuous paths, the water freely circulating between the thin walls of the honeycomb structure from one header to the other.

The cellular or honeycomb structure 24 covers substantially the whole area of the top surface 16 of casing 15 and is arranged within the casing 15 with the cells extending normal to the surface 16, and permits a free circulation of water through the thin walls thereof, and due to the multiplicity of thin walls forming the cells presents a large heat radiating surface. Instead of the honeycomb structure shown it will be apparent that the tubular structure with radiating fins shown in application Serial No. 193,575, filed May 23, 1927, may be utilized.

The assembly of headers and cellular structure is secured within the protecting casing 15 preferably shaped to serve as a foot rest by bolts 25 and nuts 26, spacing ribs 27 of equal height being provided on the headers (see Figure 4) to space the assembly from the casing to permit a free circulation of air therebetween. As the top of the casing is inclined the assembly will be inclined, though a horizontally arranged top and assembly or an inclined top and horizontal assembly may be used, if desired. The casing, it will be noted, serves as a protection for the heating element during shipment, and in use may serve as a foot rest without substantially obstructing the car body, as the greatest height from the floor may be as little as from one to two inches and at the same time effective air circulation and heating is provided.

Water from the circulatory engine cooling system is conducted to the heat radiating element 12 by means of a conduit 28 secured to a tubular extension 29 of the connection 30 in conduit 8 of the circulatory system, or if desired to a connection tapped into the engine jacket or head at any suitable point for the withdrawal of hot water. Conduit 28 is connected to the walls of threaded opening 31 in header 22 (see Figure 3). A return conduit 32 connected to threaded opening 33 of header 23 is coupled with conduit 9 of the engine cooling system adjacent pump 10 by a connection 34 or if desired to the return leg of a suitable diverter connection (not shown) of the type shown in Patent #1,575,667. The conduit 28 is provided with a valve 35 adjacent its connection with the header 22. The arrangement and size of the conduits that furnish the heat radiating element with water, and their resistances, compared to the resistance of the cooling system are such that only a restricted quantity, less than 20% of the water capacity of the cooling system of the car when valve 35 is open is diverted through the heat radiating element. The water capacity of the entire system designed to heat the car body is small, preferably about two quarts, and it is essential that a cellular structure, headers, and conduits be selected to maintain a ratio between the capacity of the cooling system and the capacity of the heating system of about, or less than, 3 or 4 to 1.

In operation, when the valve 37 is opened water will be caused to flow in restricted or limited quantity from connection 30 through extension 29, conduit 28, header 22, cellular structure, header 23, conduit 32, and connection 34 back to the engine cooling system, pump 10 causing a circulation through the radiating element within the car in proportion to the resistance offered by said element and its conduits as compared to the resistance in the cooling system. Hot or warm water is accordingly circulated through said element, heating the thin walls of the cellular structure which in turn, due to its multiplicity of heat radiating surfaces, efficiently radiates the heat into the car.

The cold air in the car adjacent the floor thereof and within the casing 15 is heated and accordingly rises through openings 16' in casing 15, thus inducing a natural circulation through the heat radiating element 12 that continues while said element is heated, due to the fact that the cold air settles to the floor of the car and that adjacent the radiating element is drawn through said element by the circulation induced within the casing by the heating of the air. It will be observed that when the radiating element is inclined to the horizontal a more effective contacting of cool air with the radiating surfaces will occur, thus increasing the heating efficiency of the arrangement. By supporting the heating or radiating element slightly above the floor level an effective natural circulation of the air in the car body over the radiating elements and effective heating of the car are secured.

It will thus be seen that an automobile heating system is provided embodying means to positively force a restricted or limited quantity of the water of the engine cooling system through a radiating element located within the car, and that means are provided whereby the heat in the water is absorbed by a multiplicity of radiating surfaces such that a circulation of the air within the car passes therebetween to secure a thoroughly effective heating of the car from a limited quantity of available water heated to temperatures below the boiling point of a binary mixture of alcohol and water. A heat radiating element is also provided of novel form including a cellular structure provided with a protective casing for shipping purposes and serving as a foot rest in use, having a substantially unrestricted circulation of air through the radiating element which permits satisfactory heating of an automobile with water at a temperature of as low as 110° F. or less.

While the inlet connection for water to the heating system is shown as being in the conduit between the engine and cooling radiator, as the discharge side of the heater is connected to the suction side of the pump it will be understood that the engine block may be tapped at any convenient point to provide hot or warm water for the heater, and such installations are contemplated as within the scope of the present invention.

The invention has been above described in detail, though the invention does not reside in such detail. The scope thereof is to be determined from the following claims that are intended to include such range of equivalents as come fairly within the terms of the following claims.

Accordingly what is desired to be secured by Letters Patent and is claimed as new is:

1. An automobile heater comprising a casing having a perforated top and spaced supports adapted to rest on the floor of an automobile and support said top in spaced relation to said floor, a pair of headers, and a cellular heat radiating structure extending between said headers, said cellular structure consisting of a multiplicity of angularly related walls providing heat radiating members, said headers and said heat radiating structure being disposed beneath said casing and supported thereby above said floor but beneath said top, and said cellular structure comprising a plurality of zigzag water conducting channels of relatively small capacity which are separated from each other to provide for free circulation of air between said channels.

2. An automobile heater comprising a casing having a perforated top and spaced supports adapted to rest on the floor of an automobile and support said top in spaced relation to said floor, a pair of headers, and a cellular heat radiating structure extending between said headers, said cellular structure consisting of a multiplicity of angularly related walls providing heat radiating members, said headers and said heat radiating structure being disposed beneath said casing and supported thereby above said floor but beneath said top, said cellular structure comprising a plurality of zigzag water conducting channels of relatively small capacity which are separated from each other to provide for free circulation of air between said channels, and said spaced supports being formed to dispose said top inclined with respect to the floor and said cellular heat radiating structure parallel to said inclined top.

3. An automobile heater comprising a casing having a perforated top and spaced supports adapted to rest on the floor of an automobile and support said top in spaced relation to said floor, a pair of headers, and a cellular heat radiating structure extending between said headers, said cellular structure consisting of a multiplicity of angularly related walls providing heat radiating members, said headers and said heat radiating structure being disposed beneath said casing and supported thereby above said floor but beneath said top, said cellular structure comprising a plurality of zigzag water conducting channels of relatively small capacity which are separated from each other to provide for free circulation of air between said channels, and each of said water conducting channels being of relatively great width in a direction substantially normal to said top and of relatively small depth in a direction substantially parallel to said top.

In testimony whereof I affix my signature.

CARL W. RUNDLETT.